United States Patent [19]

McNally

[11] Patent Number: 4,634,080
[45] Date of Patent: Jan. 6, 1987

[54] PARAFOIL VERTICAL LIFT MECHANISM

[76] Inventor: Thomas C. McNally, 3307 Frisby St., Baltimore, Md. 21218

[21] Appl. No.: 584,746

[22] Filed: Feb. 29, 1984

[51] Int. Cl.[4] .......................... B64D 17/04; B64C 3/00
[52] U.S. Cl. ...................................... 244/13; 244/4 R; 244/DIG. 1.3; 244/142; 244/2
[58] Field of Search .......... 244/1 R, 4 R, 13, DIG. 1, 244/138 R, 139, 142, 2

[56] References Cited

U.S. PATENT DOCUMENTS

| | | | |
|---|---|---|---|
| 1,245,724 | 11/1917 | Jacobs et al. | 244/DIG. 1.4 |
| 1,846,336 | 2/1932 | Icre | 114/290 |
| 2,175,229 | 10/1939 | Swofford | 244/142 |
| 2,404,544 | 7/1946 | Stelzer | 244/DIG. 1.4 |
| 2,455,044 | 11/1948 | Caplan | 244/139 |
| 3,285,546 | 11/1966 | Jalbert | 244/145 |
| 3,700,191 | 10/1972 | Page | 244/142 |

FOREIGN PATENT DOCUMENTS

| | | | |
|---|---|---|---|
| 457400 | 9/1913 | France | 244/142 |
| 496836 | 11/1919 | France | 244/142 |
| 659179 | 6/1929 | France | 244/142 |

Primary Examiner—Galen Barefoot
Assistant Examiner—Rodney Corl
Attorney, Agent, or Firm—Walter G. Finch

[57] ABSTRACT

The invention is an improved method and device for utilizing the principles of lift achieved through the dynamic physics of the airfoil. In the case of the present invention, the airfoil utilized is a parafoil. The parafoil of the present invention is a multi-layered or multi-tiered arrangement to provide an improved directly vertical lift without the less efficient angular lift of the common parafoil horizontal dispersement of lifting power. The present parafoil vertical lift mechanism consists of a plurality of parafoils assembled in a multi-layered vertical configuration, a plurality of positioning stabilization rods to maintain the basic vertical spacing of the plurality of parafoils for an immediate ballooning effect at the start for take-off, a lifting frame suitably affixed to the assembled plurality of parafoils, a plurality of stabilization tether lines, at least one counter-drag tie line, and a load connector for suitably removably affixing the load to be lifted to the lifting frame.

14 Claims, 12 Drawing Figures

PARAFOIL VERTICAL LIFT MECHANISM

BACKGROUND AND SUMMARY OF THE INVENTION

The invention relates to air lifting mechanisms and in particular to air lifting by airfoils. Specifically, it relates to an airfoil in the form of an improved parafoil of multilayered or multi-tiered configuration.

In the prior art lift mechanisms were primarily of the fixed wing type as in aircraft which were achieved through the dynamic physics of the airfoil. In subsequent prior art some mechanisms resorted to an airfoil of a configuration known as a parafoil.

The present invention goes several steps beyond the aforementioned prior art to achieve a more efficient lifting power. The common parafoil is less efficient because of the wide angular lift caused by the horizontal dispersement of the lifting power found in a common parafoil. The more efficient present invention develops an improved directly vertical lift by a multilayered arrangement of a plurality of parafoils as hereinafter described.

The parafoil vertical lift mechanism of the present invention gives a tremendous lifting capability in an almost straight up direction. At the same time the present invention provides a very compact design that is easily managed and which can be incorporated with a variety of vehicle types and objects to be moved by air transport.

The common parafoil is made up of a plurality of compartments or cells spread over an extremely wide area, something in the nature of a very wide fixed wing of an airplane airfoil, or like a very wide parachute canopy. The vertical lift capability diminishes as the tether components recede from the center. The present invention improves this vertical lift capability by its multi-layered configuration and its vertical spacing holding capability.

Each of the compartments or cells is comparably shaped like a cross-section of a fixed wing airfoil. The compartments or cells are each formed by sewing or otherwise affixing together specifically shaped lengths of cloth or fabric. The individual compartments or cells are then sewed or otherwise affixed together side by side to form the wing-like airfoil configuration. It is to be understood that it is within the scope and intent of this invention to assemble the compartments or cells with a common wall between each compartment or cells instead of first assembling individual cells before making the composite assembly.

The compartments or cells are open at the leading edge; the leading edge being at an angle to the cross-sectional configuration of the compartment or cell. The open leading edge permits each and every cell to fill with air as the parafoil moves forward into the wind or as the wind blows or moves across the parafoil. As the air fills each compartment or cell the individual compartments or cells take their wing-like cross-sectional configuration.

In the present invention the need for a wide horizontal wing-like configuration is reduced or eliminated. The present invention effectively reduces the need for tremendous horizontal widths and assembles a plurality of short-width parafoils in a multi-layered configuration. In some embodiments of the invention, parafoils can be utilized that are wider than the largest wingspan of any plane currently in existance. The multi-layered configuration provides a greater concentrated vertical lift component to the tethers leading to the load being lifted.

A plurality of ventral fins underneath each layer connect and affix each layer of the plurality of parafoils to each other. A plurality of ventral fins on the lowermost layer connect to a lifting frame for the load to be transported. Tether lines on the ventral fins make the actual connection or affixation to the next lower parafoil or to the aforementioned lifting frame. In the present invention the low total vertical component of the lift capability of the common parafoil, due to the tether lines meeting in a more or less common nexus, is replaced by almost total directly vertical components of the more or less vertically connected tethers of the plurality of multi-layered or multi-tiered parafoils.

The plurality of multi-layered or multi-tiered parafoils of the present invention eliminates the unwieldy configuration of the common parafoil and makes the present invention more easily managed.

As aforementioned, the connection of a plurality of tethers from the ventral fins under the lowermost layer or tier of the parafoils of the present invention to the lifting frame provides a more efficient vertical component of vertical lift than is possible by the long lines or tethers in an ordinary wide parafoil, many of which are from wide angles providing inefficient vertical components of vertical lift, which terminate in a nexus at the load being lifted. In the present invention the tethers are short and almost all are more or less directly vertical in relation to the lifting frame which carries the load being transported.

The lifting lines or tethers, connected to the lifting frame, determine the horizontal plane configuration of the lifting frame by their natural vertical hang or run to the point where they intersect the horizontal plane of the lifting frame.

The connecting or affixing of tethers from the aforementioned ventral fins to the next lower parafoil is similar to the connecting or affixing of tethers from the aforementioned ventral fins of the lowermost parafoil to the lifting frame. Thus, all vertical lifting components of each of the plurality of parafoils is almost a directly vertical component which gives the very efficient lifting power of the present invention. The details of the connecting or affixing means is described hereinafter in the specification of the preferred embodiments.

Another prime feature of the present invention which establishes the efficiency of the operation is the plurality of positioning stabilization rods to maintain the basic vertical spacing of the plurality of parafoils for an immediate ballooning effect at the start when ready for a take-off. Depending upon the size of the parafoil vertical lift mechanism, at least two positioning stabilization rods are used normally, however, it is to be understood that it is within the scope and intent of this invention to use only one or to use more positioning stabilization rods as the overall width increases.

Without positioning stabilization rods the plurality of parafoils would collapse upon each other when not in use and when starting for a take-off it would be difficult and almost impossible to induce air into the plurality of components or cells without some manual assistance. The positioning stabilization rods each pass through the uppermost fabric panel of one of the compartments or cells near the leading edge thereof or through a ring affixed to the leading edge. The fabric panel is suitably held in position on the positioning stabilization rod as described hereinafter in the specification for the preferred embodiments. It is this maintenance of position of the compartments or cells on the positioning stabilization rods that provides for the present invention's capability of being able to immediately fill the plurality of parafoils with air, a prime factor in the efficiency of the present invention.

The positioning stabilization rods are so arranged so that the plurality of parafoils may be totally collapsed and the positioning stabilization rod laid down to facilitate transport to another location or for temporary or long term storage.

The plurality of positioning stabilization rods may be suitably affixed to a transverse member to maintain a transverse rigid position between them. At least one additional transverse member is positioned and suitably affixed above the first transverse member to provide a frame-like rigidity to the plurality of positioning stabilization rods and as a second purpose to serve as a handle means when raising the plurality of positioning stabilization rods to their vertical position. The rigid assembly of the positioning stabilization rods is suitably affixed to the object or vehicle, which is being carried by the lifting frame, to be transported.

A preferred method of maintaining the vertical position of the plurality of positioning stabilization rods is by tying them to a forward extension of an element of the lifting frame component.

A suitable connecting means as a load connector is affixed to the lifting frame for suitably affixing the load thereto, after which the plurality of tether means on the ventral fins of the lifting frame are suitably affixed to the load to stabilize the position of the load during the transporting. These latter tether lines are for stabilization only and do not bear any weight of the load lifted. The load is carried by the load connector which is suitably affixed to the lifting frame.

In order to reduce drag when forward motion is a problem, spill vents may be used on the trailing portion of each compartment or cell of the parafoils. The spill vents may be made of the permanently open type or of an open/closed type. The use of spill vents will reduce the lift capability slightly.

A suitable net arrangement may be positioned under the lifting frame assembly when the parafoil vertical lifting mechanism is to be collapsed during a non-use mode or for temporary or permanent storage. The net arrangement purpose is to collect the loose tether lines, ventral fins, and assembled plurality of parafoils and the lowered positioning stabilization rods. The net arrangement may be then gathered over the top of the collapsed parafoil vertical lifting mechanism to secure all of the numerous components of the system.

The structure of the parafoil vertical lifting mechanism may also be arranged so that the various components, such as each of the plurality of parafoils with affixed ventral fins and tethers, each of the positioning stabilization rods, the lifting frame assembly, and other elements or components may be further disassembled for compact permanent storage or for shipment when not in use.

The parafoil vertical lift mechanism of the present invention may be utilized to lift a plurality of loads in a plurality of configurations, such as, but not limited to: a bicycle-type conveyance; an individual person airplane-like fuselage conveyance; a boat-like or amphibious-type conveyance; a truck-type cargo carrier or a comparable passenger-type carrier; and other similar bi-mode configurations.

It is to be noted that the aforementioned variation in types of loads that can be transported by the parafoil vertical lift mechanism are all bi-mode structural types; thus, the load types can be utilized as the air transported conveyeance as one mode and also on the ground or other environment as another mode.

Furthermore, it is to be noted that in some instances the means of forward propulsion may be by mechanical means, such as by an engine driven propeller or jet propelled, or by human powered means, such as a manually powered propeller.

With the wide range of bi-mode means the parafoil vertical lift mechanism can be utilized for ground to ground air-lifted transportation and for water to ground or ground to water air-lifted transportation (such as for off-loading ships off shore). These capabilities make the present invention useful in both civilian uses as well as for military uses.

It is, therefore, an object of this invention to provide a mechanism that has a highly efficient vertical lift capability.

It is another object of this invention to provide a mechanism that can air lift a plurality of bi-mode types of transport means.

It is also an object ot this invention to provide an air transport means that may be mechanically or manually propelled.

It is still another object of this invention to provide a mechanism that is in a structural configuration that has an immediate vertical lift capability at the start of take-off.

It is yet another object of this invention to provide a mechanism that has a structure that can be collapsed easily for temporary or permanent storage when not in use.

It is yet still another object of this invention to provide a mechanism that has a structure that can be disassembled easily into component parts for compact storage or shipment.

Further objects and advantages of the invention will become more apparent in light of the following description of the preferred embodiments.

DESCRIPTION OF THE PREFERRED EMBODIMENTS

Referring now to the drawings and particularly to FIGS. 1, 5, 6, and 7 a first embodiment of an improved parafoil vertical lift mechanism is shown at 13. A second embodiment of an improved parafoil vertical lift is shown at 14 in FIGS. 8, 9, and 11 and will be described later.

The improved parafoil vertical lift mechanism 13 will be described first, it is shown in a perspective view in FIG. 1 having three layers or tiers of parafoils. Thus, it can be seen that the improved parafoil vertical lift mechanism 13 is composed of a plurality of parafoils in conjunction with other components as described hereinafter.

The improved parafoil vertical lift mechanism 13 consists of a parafoil component 15, a parafoil stabilizing component 40, and a lifting frame component 60. The elements of the aforementioned components 15, 40, and 60, respectively, are described hereinafter. The cooperation of the components 15, 40, and 60, respectively, to form the structure is described hereinafter as the elements thereof are presented.

Describing first the parafoil component 15, the parafoil component 15 consists of a plurality of parafoils 16, a plurality of ventral fins 28, a plurality of parafoil tethers 32, and a plurality of load frame tethers 38. The cooperation of the aforementioned elements of the parafoil component 15 is described hereinafter.

Each parafoil 16 of the plurality of parafoils 16 consists of a plurality of compartments or cells 18, hereinafter referred to as cells 18. Each cell 18 of the plurality of cells 18 is made up of a pair of side panels 20, a top panel 22, and a bottom panel 24. These panels 20, 22, and 24 are sewed or otherwise affixed to each other to form the compartment-like cell 18. The formed cell 18 has a hollow interior with an open end 26 which is the leading edge when in use. In configuration each cell 18 has a side elevation and corresponding cross section similar to that of an airfoil of a fixed wing aircraft. This fixed wing type of configuration can be observed in FIGS. 1, 5, 6, and 7.

As noted, the cell 18 is open 26 at the leading edge and when sewed or otherwise affixed together the panels 20, 22, and 24 are configured from the open 26 leading front or edge to a wedge-like form at the rear or trailing edge.

It is to be noted that the individual cells 18 of the plurality of cells 18 are then sewed or otherwise suitably affixed to each other side by side to form each of the parafoils 16. Six cells 18 are shown making up one parafoil 16 for purposes of illustration, however, it is to be noted that the number of cells 18 making up a parafoil 16 may be varied within the scope and intent of this invention.

It is also to be noted that while each cell 18 is illustrated as having two side panels 20 and then sewed or suitably affixed to the adjacent cell 18, it is within the scope and intent of this invention that a common side panel 20 may be used between adjacent cells 18. Furthermore, it is also within the scope and intent of this invention that cells 18 may be formed of a single piece or a plurality of pieces of fabric less than the four panels aforementioned.

Note should be made of the configuration of the open leading front or edge 26 that the top panel 22 extends forward of the bottom panel 24 so as to form and facilitate a scoop-like entrance for air to fill the cell when in motion. This configuration can be observed in FIGS. 1, 5, 6, and 7.

The plurality of ventral fins 28 are sheet-like and are sewed or otherwise suitably affixed to each of the parafoils 16 at the lower seam 30 where the side panel 20 and the bottom panel 24 meet. Four ventral fins 28 are illustrated in FIG. 1 spaced apart across the width of each parafoil 16. However, it is to be understood that the number of ventral fins 28 may be varied in relation to the number of seams 30 available and the spacing apart found to be most practical for the parafoil vertical lift mechanism 13 being constructed. The ventral fins 28 may be arched as illustrated in FIG. 1. It is to be understood, however, that other geometrical configurations are within the scope and intent of this invention.

At suitable points along the lower edge of each of the ventral fins 28, such as at the arch ends, a portion of the plurality of parafoil tethers 32 are suitably affixed to each of the ventral fins 28. The distal ends of each of the parafoil tethers 32 are then suitably affixed to the upper seam of the cells 18, where panels 20 and 22 meet, which is positioned directly below the ventral fin 28 from above. The affixation of the distal end of each parafoil tether 32 to the aforementioned upper seam may be removably affixed by a combination snap hook and eye means 34 or an equivalent combination, such as a snap hook and eye or ring loop.

The plurality of load frame tethers 38 are affixed to the lowermost ventral fins 28 in a manner similar to that described for the parafoil tethers 32. The distal ends of the load frame tethers 38 also have a similar snap hook and eye means 34, except that the eye means portion is suitably affixed to appropriate members of the lifting frame component 60.

A vent 39 is provided in each of the cells 18 near the trailing edge thereof to permit air in the cell 18 to escape in order to reduce drag during forward movement. However, this will reduce the lift capability depending upon the size of the vent 39. Mechanically controlled adjustment of the size of the vent 39 opening may be utilized to obtain the optimum relation between drag and forward movement for whatever load is being transported.

An eyelet 36 is provided in appropriate top panels 22 to form an aperture therein for a member of the parafoil stabilizing component 40 as hereinafter described. The eyelet 36 forming the aperture is more or less in the form of a grommet.

Turning now to the structure of the parafoil stabilizing component 40, the parafoil stabilizing component 40 consists of a plurality of stabilizing rods 42, a first transverse member 44, a second transverse member 46, a tether member 48, a tether connector 50, a plurality of flange and clamp means 52, and a plurality of decorative pendants 54. The cooperation of the aforementioned elements of the parafoil stabilizing component 40 is described hereinafter.

The more or less vertical stabilizing rods 42 are suitably affixed at their lowermost ends to a first transverse member 44, and at a vertically spaced distance to a second transverse member 46. It is to be noted that the affixation of the stabilizing rods 42 to the first and second transverse members 44 and 46, respectively, may be a permanent connection or preferably they may be removably affixed so as to facilitate dismantling. A further modification that is within the scope and intent of the invention is that at the affixation points of one or both of the transverse members 44 and 46, respectively, the affixation may be further hingedly and lockably affixed so as to facilitate the temporary collapsing of the parafoil vertical lift mechanism 13. The second transverse member 46 can also serve as a handle or grip when raising the parafoil vertical lift mechanism 13 from a collapsed or temporary storage position to a raised position ready for flight.

The tether member 48 is suitably rigidly affixed to the first transverse member 44 and then suitably affixed 50 to the load being transport or it may be suitably affixed to a forward extension of the main load member 66. When affixed in place the parafoil stabilizing component 40 maintains the general vertical spacing of the plurality of parafoils 16 in preparation for their filling with air as the parafoil vertical lift mechanism 13 starts take-off to lift its load.

In assembly, the vertical stabilizing rods 42 each pass through an aperture in the top panel 22 of an appropriate cell 18 of each of the plurality of parafoils 16. The appropriate cells 18 referenced above are in vertical alignment with each other as can be seen in FIG. 1. A description of the means for holding each of the apertures in the top panels 22 in place on the vertical stabilizing rods 42 is provided hereinafter.

Figure 2:
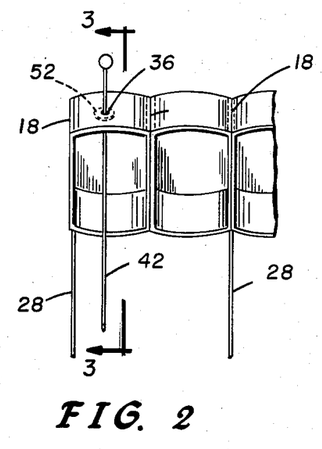
FIG. 2 is a partial view of cells of a parafoil of the parafoil vertical lift mechanism of FIG. 1.
Figure 3:
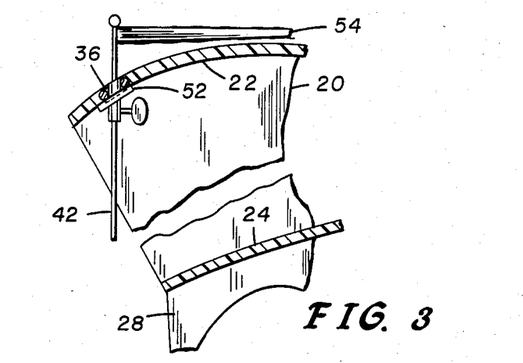
FIG. 3 is an enlarged partial cross-section view of FIG. 2 on line 3—3.
Figures 4, 5:
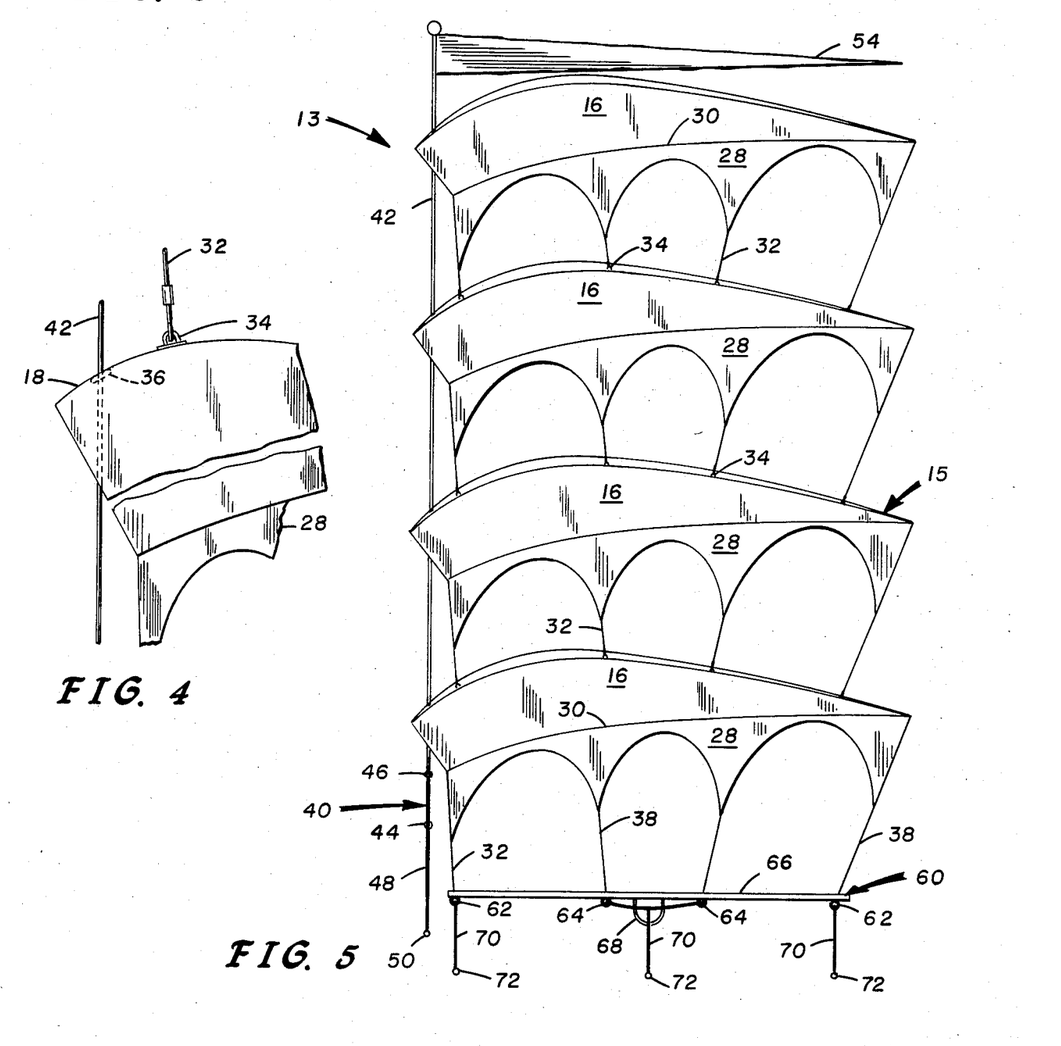
FIG. 4 is an enlarged partial side view of a cell of the parafoil of a parafoil vertical lift mechanism of FIG. 1, showing a tether connection.
FIG. 5 is a side view of a typical parafoil vertical lift mechanism similar to FIG. 1 having a plurality of parafoils.

As aforementioned, an eyelet 36 is provided in the top panels 22 of the appropriate cells 18 to form the apertures therein. The stabilizing rods 42 pass through the set of apertures directly above. A combination flange and clamp 52 is slidably placed upon each of the stabilizing rods 42 for each aperture through which the stabilizing rod 42 passes. FIGS. 2, 3, and 4 provide the details of the combination flange and clamp 52. The flange and clamp 52 are each slidably moved upwardly on the stabilizing rod 42 until each parafoil 16 is in approximately the correct position and correct spacing from the adjacent parafoil or parafoils 16. The flange and clamp 52 is then tightened to the stabilizing rod 42 by use of the clamp means.

To facilitate locating the combination flange and clamps 52 each time the parafoil vertical lift mechanism 13 is set up, marks may be placed on the stabilizing rods 42 or detent indentations may be made in the surface of the stabilizing rods 42. Such detent indentations will also improve the grip of the clamping action and help prevent slippage.

Thus, with the parafoils 16 held at a vertical spacing from each other, the open leading edge 26 of each cell is ready to receive air for a quick inflation as the parafoil vertical lift mechanism 13 begins take-off with its load.

Figure 1:
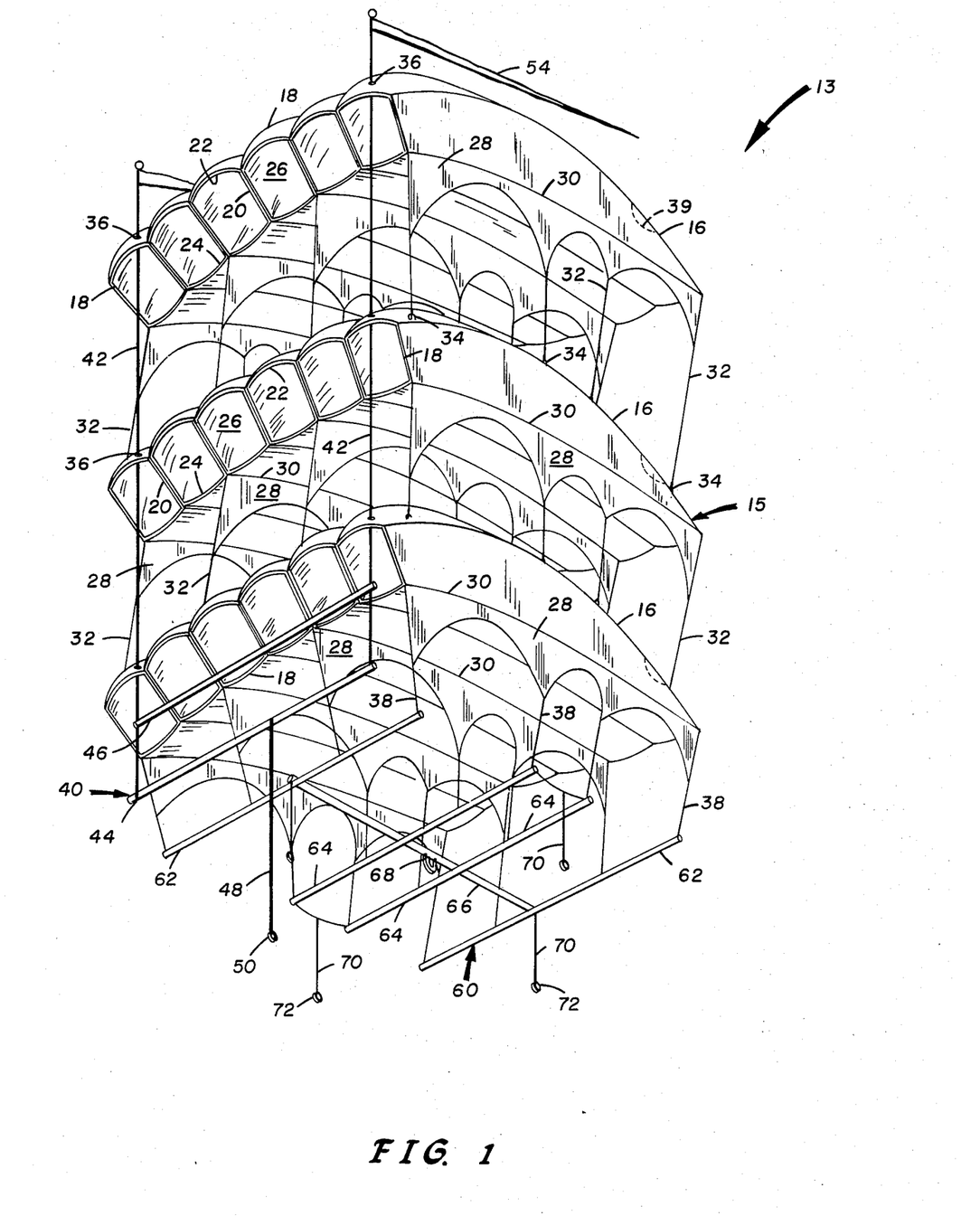
FIG. 1 is a perspective view of a first embodiment of a parafoil vertical lift mechanism having a plurality of parafoils.

It is to be noted that it is within the scope and intent of this invention to have more than two parafoil stabilizing rods 42 as shown in FIG. 1.

A decorative pendant 54 may be added to the upper distal end of each of the stabilizing rods 42 and to also serve as a stop to prevent the top panel 22 rising and moving off of the uppermost end of the stabilizing rod 42.

As each cell 18 of each parafoil 16 fills with air the top panel 22 may rise a bit and the top panel 22 may move off of the flange portion of the combination flange and clamp 52.

A rear parafoil stabilizing rod may also be incorporated to maintain the rear or trailing edge of the parafoils in a raised position prior to take off in order to keep the parafoils and tether lines from becoming entangled in the propeller means before the parafoils fill with air.

Turning now to the lifting frame component 60, the lifting frame component 60 consists of a plurality of end transverse members 62, a plurality of interior transverse members 64, a main load member 66 (which may be extended forwardly as hereinbefore mentioned), a load connection means 68, a plurality of load tethers 70, and a plurality of load tether connection means 72.

The main load lifting member 66 is suitably affixed, as shown in FIG. 1, to the plurality of end and interior transverse members 62 and 64, respectively. The main load lifting member 66 and the plurality of end and interior transverse members 62 and 64, respectively, are shown as round or circular in cross section, it is to be understood, however, that the cross sectional configuration may be of any suitable geometric shape consistent with carrying the intended load.

The load connection means 68 is shown as a loop or eye shaped member which is suitably affixed to the main load lifting member 66. This configuration is such that a hook-like load connection with a safety lock or a yoke and bolt connection from a load to be carried can be conveniently and safely connected to the load connection means 68.

The plurality of load tethers 70 are spaced around the lifting frame component 60 and suitably connected to the members comprising the lifting frame component 60 as shown in FIG. 1. Suitable tether connectors 72 are suitably affixed to the distal ends of each load tether 70 for connecting to the load to be carried. It is to be noted that the load tethers 70 are not for carrying or supporting the load, but are for stabilizing the load position under the lifting frame component 60 only.

Figure 6:
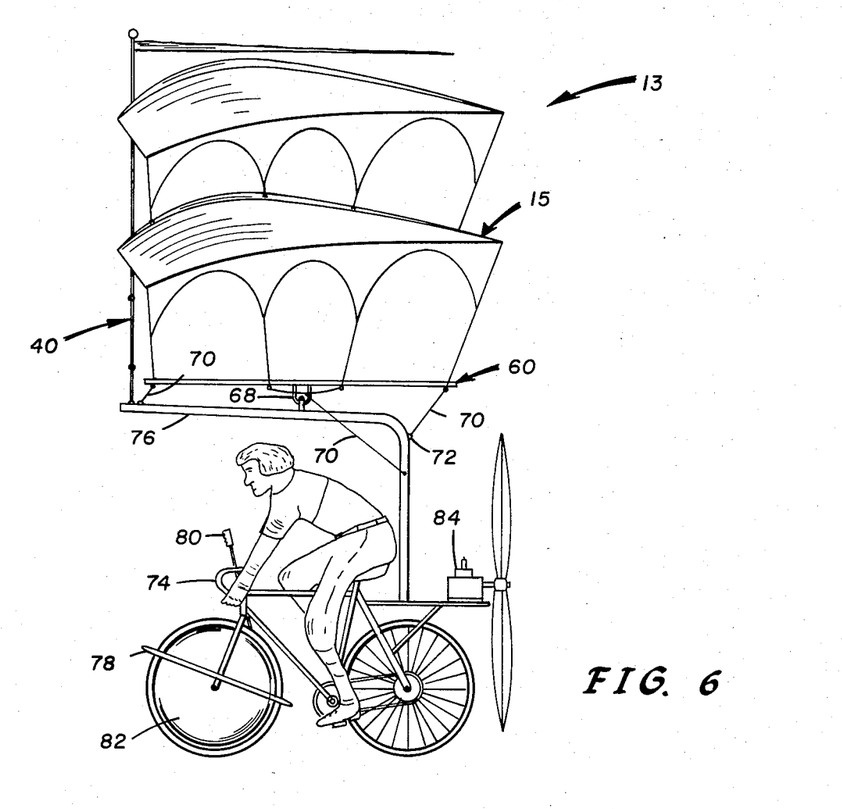
FIG. 6 is a side view of a typical load bearing parafoil vertical lift mechanism having a plurality of parafoils similar to FIG. 1.
Figure 7:
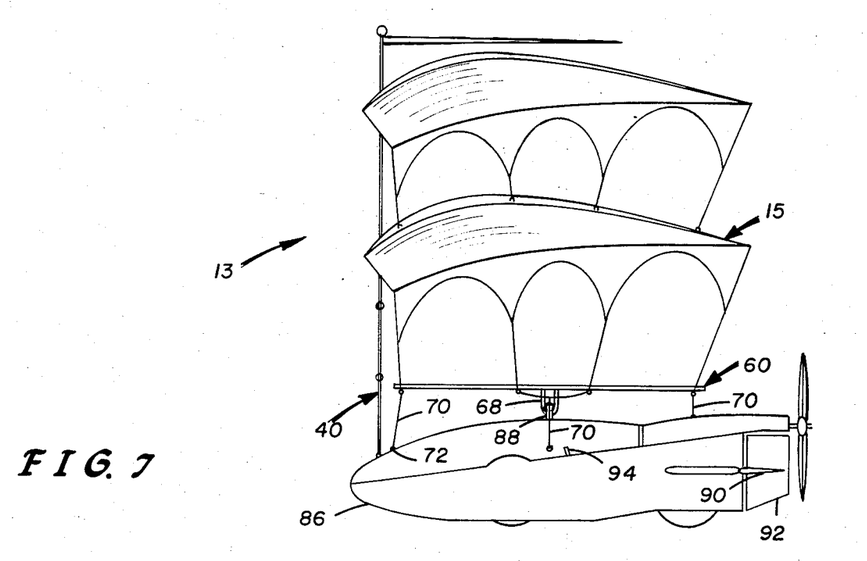
FIG. 7 is a side view of another typical load bearing parafoil vertical lift mechanism having a plurality of parafoils similar to FIG. 1.
Figure 8:
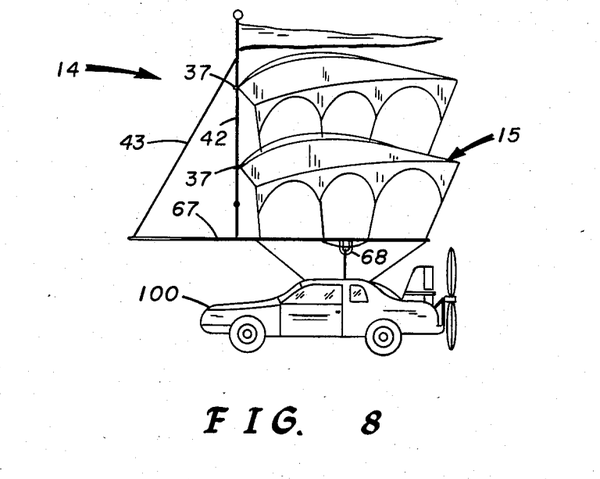
FIG. 8 is a side view of a second embodiment of a parafoil vertical lift mechanism having a plurality of parafoils, having a typical load.
Figure 9:
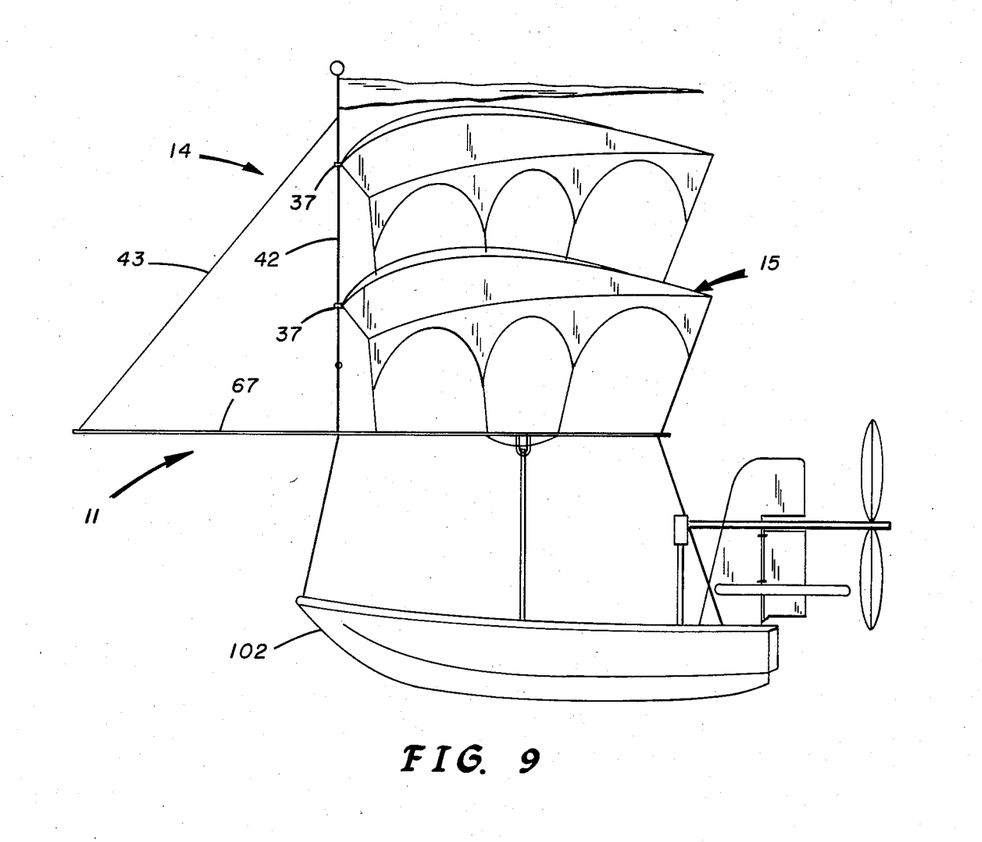
FIG. 9 is a side view of another typical load bearing parafoil vertical lift mechanism having a plurality of parafoils similar to FIG. 8.
Figure 10:
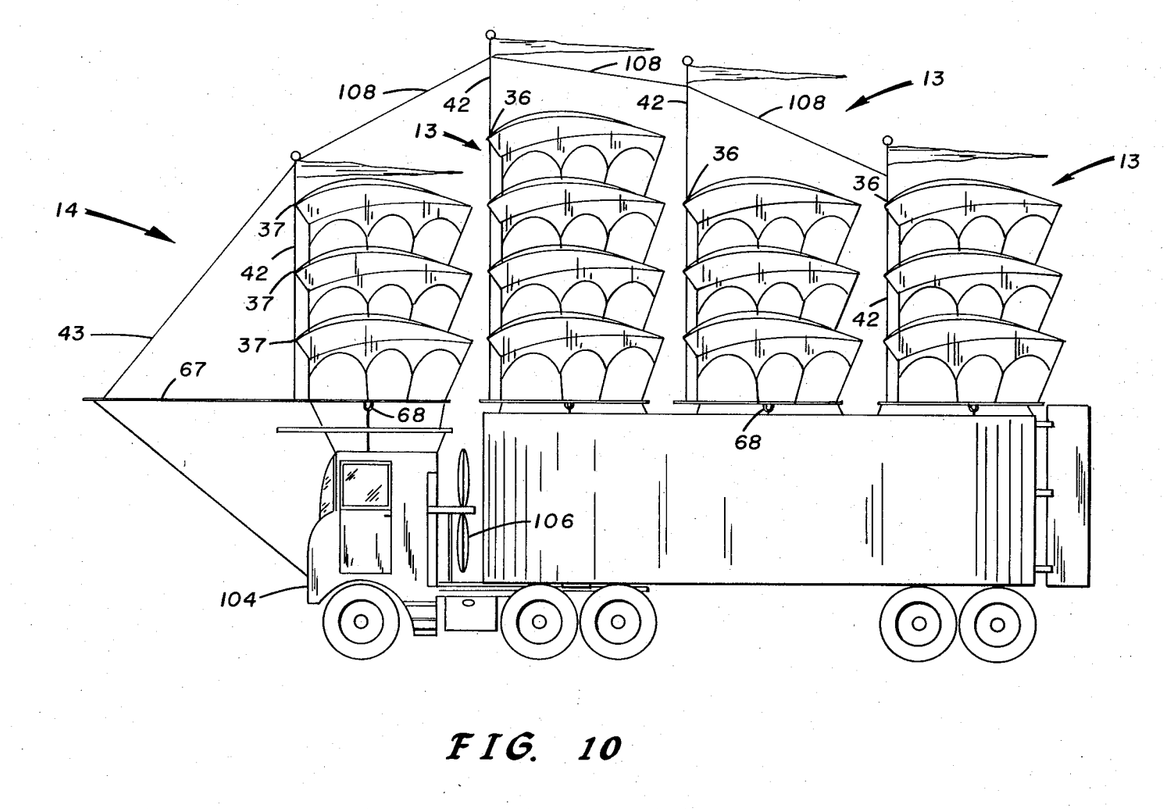
FIG. 10 is a side view of still another typical parafoil vertical lift mechanism having a plurality of parafoils similar to FIG. 8.

Typical loads are shown in FIGS. 6, 7, 8, 9, and 10. FIG. 6 shows a bicycle type load 74; FIG. 7 shows an enclosed airplane like load 86 which may be used as a carrier; FIG. 8 shows the load as an automobile 100; while FIG. 9 shows the load as a small boat 102; and FIG. 10 shows the load as a truck-tractor semi-trailer 104 arrangement. Other types of loads can be carried.

Figure 11:
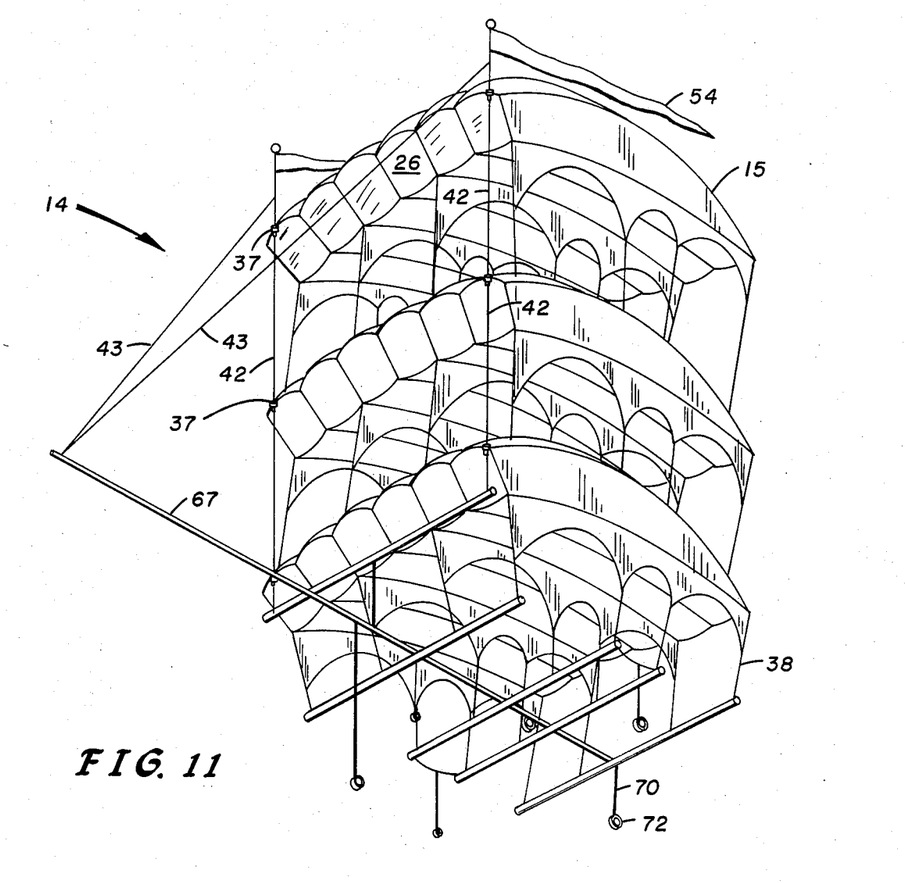
FIG. 11 is a perspective view of the second embodiment of a parafoil vertical lift mechanism having a plurality of parafoils.

FIGS. 8, 9 and 11 show a second embodiment 14 of an improved parafoil vertical lift mechanism which is described hereinafter.

The second embodiment of an improved parafoil vertical lift mechanism 14 is substantially similar in general overall structure to the first embodiment 13, regarding the parafoil components 15, the parafoil stabilizing component 40, and the lifting frame component 60. However, the second embodiment 14 modifies the forward support means as further described hereinafter.

The modifications of the second embodiment 14 over the structure of the first embodiment 13 provides for a forward extension member 67 from the lifting frame component 60, an external eye or loop 37 instead of an eyelet 36, and a main tie-line or main securing line 43 from the uppermost portion of each of the parafoil stabilizing components 40 to the distal end of the forward extension member 67. These modifications can be seen in FIGS. 8, 9 and 11.

The second embodiment 14 of an improved parafoil vertical lift mechanism provides greater vertical stability of the parafoil stabilizing components 40, particularly when the drag increases and when very large parafoil vertical lift mechanisms are in use.

Figure 12:
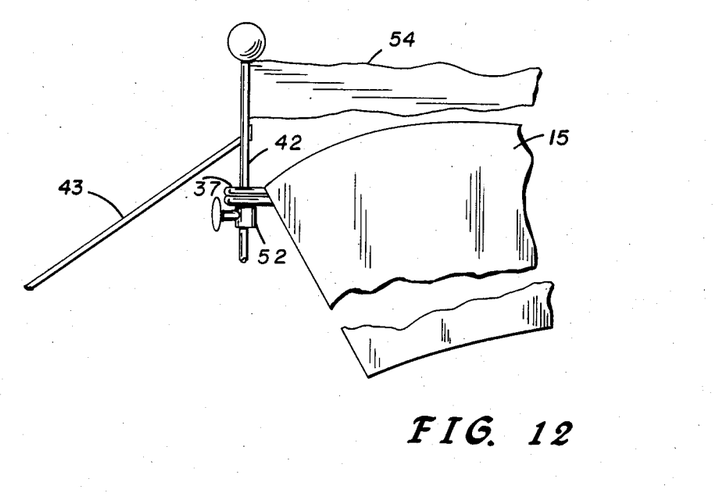
FIG. 12 is an enlarged partial view of FIG. 11, showing a parafoil connection to a stabilization rod.

Note in FIGS. 8, 9, and 11 and in the detail of FIG. 12, that with the external eye or loop 37 affixed to and forward of the leading edge of the parafoil component 15 the parafoil stabilizing rod 42 does not pass through the top panel 22 as in the first embodiment 13. As the parafoil stabilizing rod 42 passes through the series of external eyes or loops 37 it fixes the parafoil stabilizing rod 42 at a point in front of the parafoil components 15.

As shown in FIG. 12, a flange and clamp device 52 locates the external eyes or loops 37 in proper position along the vertical length of the parafoil stabilizing rod 42 in a manner similar to that provided for locating the eyelets 36 along the vertical length of the parafoil stabilizing rod 42.

The forward extension member 67 is ridgedly affixed to the lifting frame component 60 so that the forward extension member 67 projects forward of the lifting frame component 60 structure. The tie-lines or securing lines 43 are then suitably affixed to the uppermost portion of the parafoil stabilizing rod 42 and to the extended distal end of the forward extension member 67. This latter arrangement can best be seen in FIG. 11.

FIG. 10 shows an arrangement using a combination of both the first and second embodiments 13 and 14, respectively, of improved parafoil vertical lift mechanisms. In this case further use of subordinate tie-lines or securing-lines 108 are used to secure the rearward parafoil stabilizing rods 42 in vertical position by anchoring them to the most forward parafoil stabilizing rod or rods 42 in the second embodiment 14 mode.

In FIG. 10 suitable propellers 106 are provided on each side of the truck-tractor portion to extend outwardly beyond the semi-trailer body.

In each of the typical loads note that the parafoil vertical lift mechanisms 13 and 14 are the main load lifting structure, consisting of the aforementioned parafoil component 15, the parafoil stabilizing component 40, and the lifting frame component 60.

Each typical load requires some adaption means in order to properly hang or affix it to the parafoil vertical lift mechanism 13 or 14. For example the bicycle type load 74 has an adapter connector 76 to hook onto the load connection means 68, the enclosed airplane-like load 86 has an adapter connector 88. The load tethers 70 are then suitably connected to the typical load by the load connectors 72.

In turn each typical load must have some means of control and propulsion, either manual or mechanical, for example as shown in FIG. 6 the bicycle type load 74 has a mechanical means of propulsion 84 connected to the propeller.

On the bicycle type load 74 a typical adapted elevator member 78 is shown on the front wheel with a control lever 80 at the handle bar. A typical adapted rudder member 82 is also shown on the front wheel which the handle bar controls.

Controls on the enclosed airplane like load 86 consist of a typical elevator member 90, a typical rudder member 92, and a typical combined control 94 for both the elevator member 90 and the rudder member 92.

Controls and propulsion means on the other typical loads are similar to achieve the necessary forward motion and the control of the motion.

As can be readily understood from the foregoing description of the invention, the present structure can be configured in different modes to provide the ability to give vertical lift to loads by a plurality of parafoils.

It is to be noted that in certain embodiments of the invention as described, a single tier parafoil configuration can be constructed, if desired.

Accordingly, modifications and variations to which the invention is susceptible may be practiced without departing from the scope and intent of the appended claims.

What is claimed is:

1. A vertical lift mechanism, comprising:
a plurality of parafoil means, said plurality of parafoil means being suitably affixed into a multi-tiered configuration, each parafoil means of said plurality of parafoil means consists of a plurality of cell means, each cell means of said plurality of cell means having a top panel member, a bottom panel member, and two side panel members, said top, bottom, and two side panel members being suitably affixed to each other to form each of said cell means, said cell means being open at the front end thereof, the side elevation cross-sectional configuration of each said cell means being similar to the cross sectional configuration of a fixed wing aircraft airfoil, each said cell means having an adjustable vent means in and near the rear of said top panel member, said top panel member being longer and extending forward of said bottom panel member at said open front end of each said cell means;
a parafoil stabilization means, said parafoil stabilization means being suitably affixed to said plurality of parafoil means, said parafoil stabilization means maintaining each of said parafoil means of said plurality of parafoil means in a spaced apart relation to each other, said parafoil stabilization means consists of a plurality of parafoil stabilization rods, a plurality of transverse members, a parafoil stabilization means tether, a tether connector means, and a plurality of combined flange and clamp means, and additionally a plurality of grommet-like eyelet means for said plurality of parafoil means, said plurality of parafoil stabilization means being suitably affixed to each of said plurality of transverse members, said plurality of transverse members being spaced apart for said affixation to said plurality of parafoil stabilization means, said parafoil stabilization means tether being suitably affixed to one of said plurality of transverse members, said tether connector means being suitably affixed to the distal end of said parafoil stabilization means tether, said plurality of grommet-like eyelet means being each individually affixed into specific said top panel members of said cell means so as to thereby form an aperture through each said specific top panel member, said specific top panel members being equally distributed and located spaced apart in each of said plurality of parafoil means so that said apertures of said grommet-like eyelet means are in horizontally spaced apart locations in each said parafoil means and are also in vertical alignment with said apertures of said grommet-like eyelet means in each of the other said parafoil means, each of said plurality of parafoil stabilization rods being slidably inserted into and through one of said vertical alignments of said apertures of said grommet-like eyelet means in said specific top panels of said cell means in each said parafoil means, said plurality of combined flange and clamp means being distributed, located, and slidably arranged on said plurality of parafoil stabilization rods so as to provide one said combined flange and clamp means under each said aperture of said grommet-like eyelet means, said combined flange and clamp means being thereafter affixed in place by clamping at selected spaced apart locations on each said parafoil stabilization rod so as to maintain a vertical spaced apart relationship between each of said parafoil means of said plurality of parafoil means; and a load frame means, said load frame means being suitably affixed to said plurality of parafoil means.

2. A vertical lift mechanism as recited in claim 1, wherein said plurality of cell means are assembled to form each of said parafoil means of said plurality of parafoil means, by suitably aligning and affixing each cell means to an adjacent cell means at a side panel member thereof.

3. A vertical lift mechanism as recited in claim 1, and additionally, a plurality of ventral fin members, a plurality of parafoil tether means, a plurality of parafoil tether connector means, a plurality of load frame tether means, and a plurality of load frame tether connector means, said plurality of ventral fin members being equally distributed between, spaced apart, and suitably affixed to the lowermost side of each of said parafoil means of said plurality of parafoil means, said plurality of parafoil tether means being equally distributed between, spaced apart, and suitably affixed to the lowermost edge of each said ventral fin member of said plurality of ventral fin members, except said ventral fin members affixed to the lowermost parafoil means, each of said parafoil tether connector means of said plurality of parafoil tether connector means having a first portion and a second portion, each said first portion of said parafoil tether connector means being suitably affixed to the distal end of each said parafoil tether means, each said second portion of said parafoil tether connector means being suitably affixed to the uppermost surface of one of said parafoil means so as to be aligned with said first portion thereof and thereabove, said plurality of load frame tether means being equally distributed between, spaced apart, and suitably affixed to the lowermost edge of each said ventral fin member affixed to the lowermost parafoil means, each of said load frame tether connector means being suitably affixed to the distal end of each said load frame tether means, each said load frame tether connector means being capable of connecting to a suitable connector means on said load frame means.

4. A vertical lift mechanism as recited in claim 3, wherein said plurality of cell means are assembled to form each of said parafoil means of said plurality of parafoil means, by suitably aligning and affixing each cell means to an adjacent cell means at a side panel member thereof, said side panel member between said adjacent cell means being a common side panel member to each of said adjacent and affixed cell means.

5. A vertical lift mechanism as recited in claim 1, and additionally, a decorative means, said decorative means being suitably affixed to the upper distal end of each said parafoil stabilization rod of said plurality of parafoil stabilization rods, said decorative means serving to prevent the uppermost said apertures of said grommet-like eyelet means from slidably escaping from the upper distal end of said parafoil stabilization rod.

6. A vertical lift mechanism as recited in claim 3, wherein said load frame means consists of a main load member, a plurality of end transverse members, a plurality of interior transverse members, a load connection means, a plurality of load tether means, and a plurality of load tether connector means, said main load member being suitably affixed to said plurality of end transverse members and said interior transverse members, said load connection means being suitably affixed to said main load member, said plurality of end transverse members and said interior transverse members being suitably affixed to said load frame tether connector means of said plurality of parafoil means, said plurality of load tether means being spaced apart and around said load frame means and suitably affixed thereto, each of said load tether connector means of said plurality of load tether connector means being individually suitably affixed to the distal end of one of said load tether means, said load tether connector means being capable of connecting to a suitable connector means on a typical load to be carried.

7. A vertical lift mechanism as recited in claim 6 and additionally, a typical load to be carried, said load to be carried having an adapter load connector means, and a plurality of adapter load tether connector means, said adapter load connector means being suitably affixed to said typical load to be carried, said adapter load connector means being further suitably affixed to said load connection means of said load frame means, said plurality of adapter load tether connector means being spaced apart and around and suitably affixed to said typical load to be carried, said plurality of adapter load tether connector means each being individually further suitably affixed to one of said plurality of load tether connector means of said load frame means.

8. A vertical lift mechanism as recited in claim 7, wherein said typical load to be carried is a bicycle type load.

9. A vertical lift mechanism as recited in claim 7, wherein said typical load to be carried is an enclosed airplane-like fuselage type load.

10. A vertical lift mechanism as recited in claim 7, wherein said typical load to be carried is a small boat.

11. A vertical lift mechanism as recited in claim 7, wherein said typical load to be carried is a truck-trailer arrangement.

12. A vertical lift mechanism as recited in claim 9, wherein said typical load to be carried is an automobile.

13. A vertical lift mechanism, comprising:

a plurality of parafoil means, said plurality of parafoil means being suitably affixed into a multi-tiered configuration, each parafoil means of said plurality of parafoil means consists of a plurality of cell means, each cell means of said plurality of cell means having a top panel member, a bottom panel member, and two side panel members, said top, bottom, and two side panel members being suitably affixed to each other to form each of said cell means, said cell means being open at the front end thereof, the side elevation cross-sectional configuration of each said cell means being similar to the cross sectional configuration of a fixed wing aircraft airfoil, each said cell means having an adjustable vent means in and near the rear of said top panel member, said top panel member being longer and extending forward of said bottom panel member at said open front end of each said cell means;

a parafoil stabilization means, said parafoil stabilization means being suitably affixed to said plurality of parafoil means, said parafoil stabilization means maintaining each of said parafoil means of said plurality of parafoil means in a spaced apart relation to each other, said parafoil stabilization means consists of a plurality of parafoil stabilization rods, at least one transverse member, a parafoil stabilization means tether, connector means, and a plurality of combined flange and clamp means, and additionally a plurality of external eye loop means for said plurality of parafoil means, a load frame means, a forward extension member for said load frame means, and a plurality of main securing line means, said plurality of parafoil stabilization means being suitably affixed to said at least one transverse member, said parafoil stabilization means tether being suitably affixed to said at least one transverse member, said tether connector means being suitably affixed to the distal end of said parafoil stabilization means tether, said plurality of external eye loop means being individually affixed to the leading edge of specific said top panel members of said cell means so as to thereby form an external eye loop adjacent to said leading edge of each said specific top panel member, said specific top panel members being equally distributed and located spaced apart in each of said plurality of parafoil means so that said external eye loop means are in horizontally spaced apart locations on each said parafoil means and are also in vertical alignment with said external eye loop means on each of the other said parafoil means, each of said plurality of parafoil stabilization rods being slidably inserted into and through one of said vertical alignment of said external eye loop means on said specific top panels of said cell means in each said parafoil means, said plurality of combined flange and clamp means being distributed, located, and slidably arranged on said plurality of parafoil stabilization rods so as to provide one said combined flange and clamp means under each said external eye loop means, said combined flange and clamp means being thereafter affixed in place by clamping at selected spaced apart location on each spaced apart relationship between each of said parafoil means of said plurality of parafoil means, said forward extension member of said load frame means being an extension of a main load member of said load frame means, said forward extension member being suitably affixed thereto, each of said plurality of main securing line means having one end thereof being suitably affixed to the uppermost portion of one of said plurality of stabilization rod means, the distal end of each of said plurality of main securing line means being suitably affixed to the distal end of said forward extension member; said load frame means being suitably affixed to said plurality of parafoil means.

14. A vertical lift mechanism as recited in claim 13 and additionally, a decorative means, said decorative means being suitably affixed to the upper distal end of each said parafoil stabilization rod of said plurality of parafoil stabilization rods, said decorative means serving to prevent the uppermost of said external eye loop means from slidably escaping from the upper distal end of said parafoil stabilization rod.

* * * * *